United States Patent [19]
Rees

[11] 3,951,108
[45] Apr. 20, 1976

[54] MEANS FOR SUPPORTING A DISPLACEABLE MASS ON A STATIONARY FRAME

[75] Inventor: Karl Rees, Ruti, Switzerland

[73] Assignee: Sulzer Brothers Limited, Winterthur, Switzerland

[22] Filed: Mar. 26, 1975

[21] Appl. No.: 562,001

[30] Foreign Application Priority Data
Apr. 29, 1974 Switzerland............... 5824/74

[52] U.S. Cl................ 122/510; 165/81; 165/162
[51] Int. Cl.[2] ................... F22B 37/24
[58] Field of Search ............ 122/494, 510; 165/81, 165/162

[56] References Cited
UNITED STATES PATENTS

| | | |
|---|---|---|
| 2,697,420 | 12/1954 | Lloyd................. 122/510 |
| 3,263,672 | 8/1966 | Oechslin et al.......... 122/510 |
| 3,289,645 | 12/1966 | Evans................. 122/510 |
| 3,361,118 | 1/1968 | Breckenridge et al....... 122/510 |

Primary Examiner—Kenneth W. Sprague
Attorney, Agent, or Firm—Kenyon & Kenyon Reilly Carr & Chapin

[57] ABSTRACT

A mass which projects from a displaceable member is supported by a lever system on a stationary frame such that the bending stresses caused by the mass on the displaceable member are reduced. The lever system uses a pair of levers which are hinged to the frame, to each other and to the displacable member and mass respectively. The lever arms are arranged such that the amount of vertical movement of the displaceable member is essentially equal at the projecting end of the mass.

8 Claims, 4 Drawing Figures

MEANS FOR SUPPORTING A DISPLACEABLE MASS ON A STATIONARY FRAME

This invention relates to a means for supporting a displaceable mass on a stationary frame. More particularly, this invention relates to a means for supporting members which project from a displaceable tube wall within a stationary frame of a steam generator.

Heretofore, it has been known that one of the problems faced in the construction of a steam generator is the mounting of a projecting mass, such as a burner and/or collector, on a combustion chamber wall. This is due to the fact that the combustion chamber wall may expand considerably depending on the temperature of a working medium normally flowing through the wall and, because of this, large bending stresses may be imposed on the wall by the projecting mass. In order to avoid this problem, various types of supplementary supports have been used to support the projecting ends of these masses. For example, springs have been hung on the frame of a steam generator to support the outer ends of the projecting masses. However, these springs must be very large in order to produce a required flat spring-characteristic. Thus, this type of support is expensive.

In other cases, the projecting masses have been supported by so-called "constant hangers". These consist of springs that act through a variable gear ratio which is a function of the lift or travel so chosen that the supporting force is theoretically independent of the travel. However, this is also expensive and, in practice, the supporting force is usually not constant due to the inevitable friction.

In still other cases, use has been made of counterweights. This is also expensive and doubles the load carried by the frame.

Also, it has been known to use a support-tube to support the projecting mass and to pass a medium therethrough of the same temperature as the working medium passing through the combustion chamber wall. This is intended to produce substantially the same heat expansion in the support-tube as in the combustion chamber wall. However, because of transitory operating conditions, the temperature of the support tube generally lags behind that of the combustion chamber wall. As a result, considerable differences of expansion may occur which can result in substantial bending stresses.

Finally, it has also been known to support projecting masses by rods which are linked to nearly horizontal bands surrounding the combustion chamber. This construction, however, does not completely relieve the combustion-chamber wall, so that supplementary support must be obtained by one of the above means, e.g. springs. Moreover, this construction is suitable only when the distance between the adjacent bands is large compared with the projection.

Accordingly, it is an object of the invention to create a means for supporting a vertically-displaceable mass mounted on a displaceable member whereby a transmission of bending moments and transverse forces to the displaceable member is avoided.

It is another object of the invention to provide a simple support means for supporting the free end of members which are mounted on combustion chamber walls.

It is another object of the invention to provide an inexpensive means of supporting masses which project from a combustion chamber wall.

Briefly, the invention provides a support means which is used in combination with a stationary frame, a first displaceable member mounted in displaceable relation to the frame, and a second member mounted in projecting relation from the first member. The support means includes at least a first lever hinged at one end to the displaceable member and at a second point to the frame, and at least a second lever hinged at one end to the projecting member and at a second point to the frame. The levers are also hingedly connected to each other. This hinged connection is at the same side in relation to the points where the levers are hinged to the frame.

The system of levers acts so that the displacement of the displaceable member relative to the frame is followed by the first lever and is transmitted in reduced proportion to the second lever. The second lever, in turn, displaces the projecting end of the second member in a proportionately increased amount relative to the amount of displacement received from the first lever. The ratio of the lever arms of the two levers is such that the displaceable member and projecting member are caused to move in equal and substantially parallel relation to each other during displacement of the displaceable member under all operating conditions in a simple manner.

Because a considerable part of the projecting member becomes supported on the frame, a substantial relief of the load on the displaceable member is obtained.

These and other objects and advantages of the invention will become more apparent from the following detailed description and appended claims taken in conjunction with the accompanying drawings in which:

Figure 1:
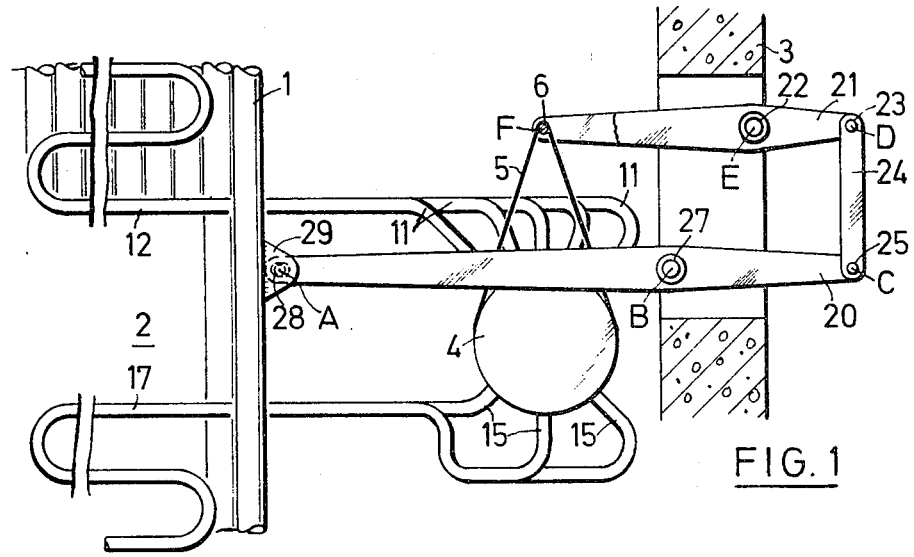
FIG. 1 illustrates a support means in accordance with the invention applied to a steam-generator.

Referring to FIG. 1, a steam generator includes a vertical tubular wall 1 made up of a plurality of tubes which are welded together in gas-tight manner to define a combustion gas flue 2. The tubes, as is known, conduct a working medium flow. The wall 1 is supported, for example in a suspended manner (not shown) at an upper end, from a stationary frame 3. In addition, a collector 4 is disposed adjacent the wall 1 and communicates via tubes 11, 15 with heating surfaces 12, 17 respectively within the flue 2 defined by the wall 1 as is known. The tubes 11, 15 pass through the wall 1 and are welded to the wall so that the mass of the collector 4 is supported in a cantilevered projecting manner from the wall 1. The wall 1, in turn, is displaceable relative to the frame 3.

A support means is connected between the collector 4 and frame 3 in order to support and displace the projecting end of the collector 4 during displacement of the wall 1. To this end, the support means is in the form of a lever system which includes two levers 20, 21. One lever 20 is hinged to the tubular wall 1 at point A. For this purpose, two eyes 29 each having elongated holes 28 are welded to the tubular wall 1. The lever 20 is located at one end between the eyes 29 and is mounted by a bolt in the elongated holes 28. The lever 20 is also hingedly or pivotably mounted on a pivot-pin 27 at a point B on the frame 3. The other end of the lever 20 is hinged by a bolt 25 to two links 24 (point C), FIG. 1 showing only one of these two links. The links 24 are hinged at their other ends (point D) to one end of the second lever 21. This lever 21 is also mounted pivotably by a pivot-pin 22 (point E) in the frame 3 and is hinged to the collector 4 at the opposite end (point F). This latter connection is carried out by means of a rod 6 connected to the lever 21 over which are laid two flat-iron loops 5 which are fastened to the collector 4.

For simplicity, FIG. 1 shows only one lever 20, 21 in each case. In the practical form of construction of the support means, the two levers 20, 21 are provided in pairs with the collector 4 and the support rod 6 disposed between them. The same applies to the other examples of construction.

The lengths of the lever arms of the two levers 20, 21 are made such that the ratio of lengths AB : AC is equal to the ratio of the lengths FE : FD. In FIG. 1, the levers 20, 21 are set parallel to one another, with the links 24 perpendicularly of them. This position corresponds to the mean position of the tubular wall 1 and of the collector 4. When the tubular wall 1 shifts upward or downward, for example because of temperature changes of the working medium flowing through the tubes, then the movement of the point F, and thus of the collector 4 are of the same magnitude and in the same direction as the movement of the eyes 29 and thus of the point A. Because the movement of the eyes 29 is small in comparison with the length of the lever-arm AB of the lever 20, the movement of the collector 4 is in very exact agreement with the movement of the point A. This prevents the tubes 11, 15 and the tubular wall 1 from becoming stressed in bending.

Figure 2:
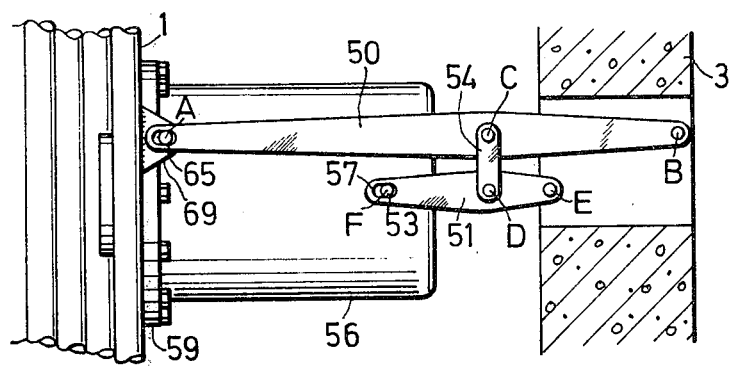
FIG. 2 illustrates a modified supporting means in accordance with the invention for supporting a burner mounted on a combustion chamber wall.

Referring to FIG. 2, wherein like reference characters indicate like parts as above, the mass projecting from the tubular wall 1 consists of a burner 56, which is attached by a flange 59 to the tubular wall 1. The first lever 50 is again mounted pivotably at one end by means of the eyes 69, and a bolt 65, to the tubular wall 1 (point A). However, instead of being connected at an intermediate point to the frame 3 as in FIG. 1, the end of the first lever 50 is mounted pivotably (point B) in the frame 3. Also, the lever 50 is connected at an intermediate connection point C, via links 54 to the second lever 51. The links 54 are connected at point D with the second lever 51, whose ends are hinged to the frame 3 at point E and with the burner 56 at point F. At point F, an elongated hole 57 is provided to take the connecting bolt 53.

The lengths of the lever-arms of the levers 50, 51 are not defined so clearly as in the levers 20, 21 of FIG. 1. However, the thus-caused inaccuracy of the movements of the points A and F are usually negligible and is compensated by the constructional simplicity of this support.

Figure 3:
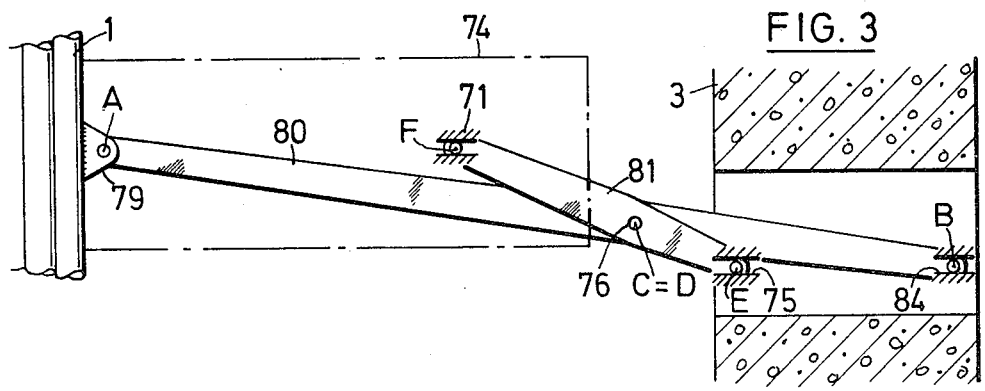
FIG. 3 illustrates another modified supporting means in accordance with the invention.

Referring to FIG. 3, the supporting means can alternatively use a lever system in which the levers are hinged together directly thus eliminating any interconnecting links. As shown, two levers 80, 81 are directly hinged to one another over a bolt 76, so that the points C and D coincide in the illustrated side view. The first lever 80 is hinged at one end via eyes 79 to the tubular wall 1 (at point A), and the other end is pivotably mounted to the frame 3 in an elongated hole 84 (point B). The dot-dash mass 74 is set in front of the two levers 80, 81, as viewed, and is guided pivotably with the second lever 81 in an elongated hole 71 (point F). The other end of the second lever 81 is pivotably supported (point E) on the frame 3, and in an elongated hole 75.

In contrast to the structure of FIGS. 1 and 2, the levers 80, 81 in FIG. 3 are not in their mean position, but are shown in the "cold" position. Upon heating of the working medium in the tubular wall 1, the supporting eyes 79 move, and thus the point A, downward. As a result, an equally large downward movement of the point F occurs because as with the example of FIG. 1, the lengths of the lever arms are defined exactly.

With the foregoing examples of construction, it was assumed that the tubular wall 1 could move only vertically. A horizontal expansion is, in most cases, negligible. In cases where that is not permissible, the levers are positioned in an inclined manner, so that, in their middle position, the levers are at right angles to the direction of displacement.

Figure 4:
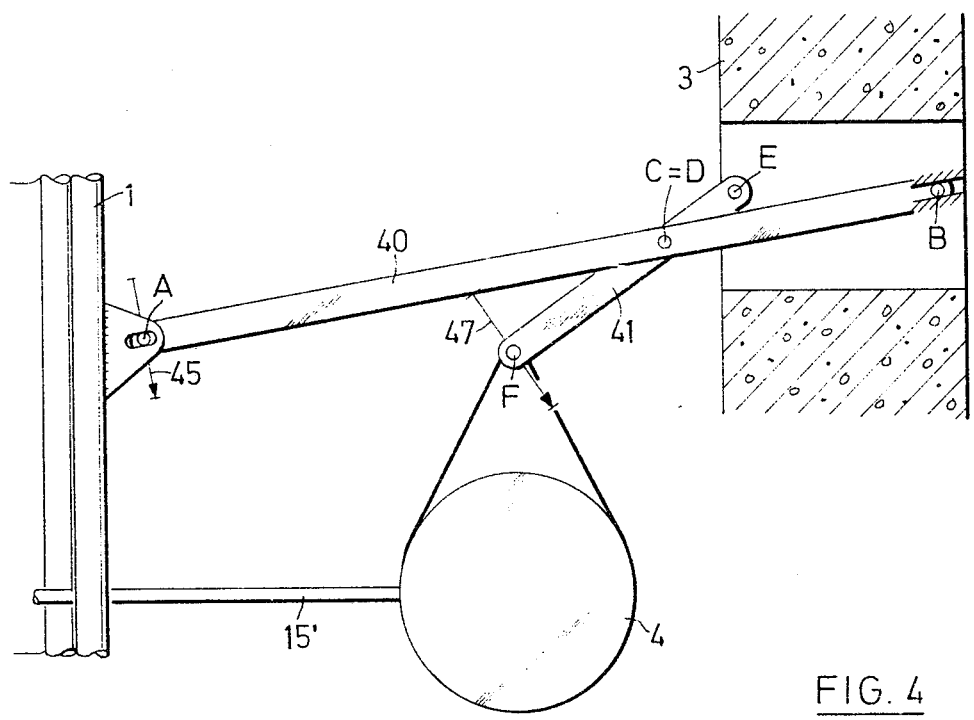
FIG. 4 illustrates a further modified supporting means in accordance with the invention.

Referring to FIG. 4, wherein like reference characters indicate like parts as above, a special case is shown, it is assumed that the point A of the first lever 40 moves in a path from a "cold" position which corresponds to end of the arrow 45 to a "hot" position which corresponds to the point of the arrow 45. At the same time, because of heating up of the connecting conduit 15' during operation, the collector 4 attempts to move in a path parallel to an arrow 47, which is longer and more inclined from the vertical than the arrow 45. To solve this problem, the levers 40, 41 which are in the mean position are each positioned to be perpendiculars which bisect the arrows 45, 47, respectively. Through a suitable choice of the points B and E for the mounting of the levers 40, 41 on the frame 3, the ratio between the levers 40, 41 is such that at a movement of the point A of the length of the arrow 45, then the point F becomes moved by the length of the arrow 47. Because the lever 41 pivots about the point E, the path of the point F is circular, instead of rectilinear. With displacements that are small relative to the lengths of the lever arms, this deviation is negligible.

What is claimed is:

1. In combination with a stationary frame, a first displaceable member mounted in displaceable relation to said frame, and a second member mounted in projecting relation from said first member;
    a support means including at least a first lever hinged at one end to said first member and at a second point to said frame, and at least a second lever hinged at one end to said second member and at a second point to said frame, said levers being hingedly connected to each other at set points thereof, this last-named connection is at the same side in relation to the points where the levers are hinged to the frame.

2. The combination as set forth in claim 1 wherein said support means further includes at least one link hingedly secured at opposite ends to a respective one of said levers.

3. The combination as set forth in claim 1 wherein said levers are hingedly connected directly to each other at respective intermediate points thereof.

4. The combination as set forth in claim 1 wherein said first lever has a first lever arm extending from said one end thereof to said second point thereof and a second lever arm extending from said set point thereof to said one end thereof, and said second lever has a first lever arm extending from said one end thereof to said second point thereof and a second lever arm extending from said set point thereof to said one end thereof, said lever arms of said first lever being in a ratio equal to the ratio of said lever arms of said second lever to each other whereby said first displaceable member and said second member are caused to move in equal and substantially parallel relation to each other during displacement of said first member.

5. The combination as set forth in claim 1 wherein said levers are in parallel relation in a middle position of the range of movements of said levers.

6. The combination as set forth in claim 1 wherein each of said first and second members is movable in a respective predetermined path and each lever bisects a respective path when in a middle position of the range of movements of said lever.

7. In combination with a satisfactory frame, a vertical tubular wall of tubes for conveying a working medium, and a collector mounted on said wall in cantilevered relation;
a support means including at least one lever hinged to said wall at one end and to said frame at a second point, and a second lever hinged to said collector at one end and to said frame at a second point, said levers being hingedly connected to each other, this last-named connection is at the same side in relation to the points where the levers are hinged to the frame.

8. In combination with a stationary frame, a vertical tubular wall of tubes for conveying a working medium, and a burner mounted on said wall in cantilevered relation;
a support means including at least one lever hinged to said wall at one end and to said frame at a second point, and a second lever hinged to said burner at one end and to said frame at a second point, said levers being pivotably connected to each other, this last-named connection is at the same side in relation to the points where the levers are hinged to the frame.

* * * * *